(12) United States Patent
Armstrong et al.

(10) Patent No.: US 7,677,583 B2
(45) Date of Patent: Mar. 16, 2010

(54) ANTI-ROTATION RUNNING BOARD BRACKET

(75) Inventors: Bradford D. Armstrong, Barrie (CA); Rudolph A. Schrempf, Brampton (CA)

(73) Assignee: Magna International, Inc., Aurora (CA)

( * ) Notice: Subject to any disclaimer, the term of this patent is extended or adjusted under 35 U.S.C. 154(b) by 316 days.

(21) Appl. No.: 11/786,127

(22) Filed: Apr. 11, 2007

(65) Prior Publication Data

US 2008/0251665 A1    Oct. 16, 2008

(51) Int. Cl.
B60R 3/00    (2006.01)
(52) U.S. Cl. .............. 280/163; 280/75; 280/164.1; 280/164.2; 280/166; 280/169; 280/175; 280/288.4; 280/291; 280/297; 280/304.3; 280/762; 280/770; 248/200; 248/229.5; 248/231.71; 248/674; 296/1.07; 296/151; 296/203.01; 152/215
(58) Field of Classification Search .............. 280/75, 280/163, 164.1, 164.2, 166, 169, 175, 288.4, 280/291, 297, 304.3, 762, 770; 248/200, 248/229.25, 231.71, 674; 296/1.07, 151, 296/203.01, 209; 152/215
See application file for complete search history.

(56) References Cited

U.S. PATENT DOCUMENTS

| | | | | |
|---|---|---|---|---|
| 1,701,581 A | * | 2/1929 | McWhinnie | ............... 280/163 |
| 3,955,827 A | * | 5/1976 | Wonigar | ..................... 280/166 |
| 4,167,272 A | * | 9/1979 | Wright et al. | .............. 280/163 |
| 5,265,896 A | * | 11/1993 | Kravitz | ..................... 280/163 |
| 5,501,475 A | * | 3/1996 | Bundy | ........................ 280/166 |
| 5,895,064 A | * | 4/1999 | Laubach | ................... 280/163 |
| 7,264,290 B2 | * | 9/2007 | Tamaya | .................... 296/1.07 |
| 2003/0184039 A1 | * | 10/2003 | Schumacher | ............... 280/163 |
| 2004/0173987 A1 | * | 9/2004 | Chapman et al. | ........... 280/163 |
| 2005/0012295 A1 | * | 1/2005 | Chevalier et al. | .......... 280/163 |
| 2007/0085376 A1 | * | 4/2007 | Kuntze et al. | .............. 296/163 |
| 2007/0126201 A1 | * | 6/2007 | Crandall | ..................... 280/163 |
| 2007/0138757 A1 | * | 6/2007 | Kuntze et al. | .............. 280/163 |
| 2008/0106058 A1 | * | 5/2008 | Demick | ................... 280/164.1 |

\* cited by examiner

*Primary Examiner*—Lesley Morris
*Assistant Examiner*—Brodie Follman
(74) *Attorney, Agent, or Firm*—Warn Partners, P.C.; Marc Luddy (57) ABSTRACT

A bracket assembly including a plurality of components attached along a hem line, a plurality of attachment points along the hem line, a first bracket, and a second bracket. The first bracket connects to the plurality of components at at least one of the plurality of attachment points, and supports a longitudinal load applied to at least one of the plurality of components. The second bracket connects to the plurality of components, and supports a lateral load applied to at least one of the plurality of components.

24 Claims, 9 Drawing Sheets

ANTI-ROTATION RUNNING BOARD BRACKET

FIELD OF THE INVENTION

The present invention relates to a bracket assembly for connecting a plurality of components.

BACKGROUND OF THE INVENTION

Many motorized vehicles today have running boards which extend along the length of the vehicle in order to assist passengers of the vehicle getting in or out of the vehicle. Typically, the passenger uses the running board as a step to get into or out of the vehicle. Thus, the running board has to be adequately secured to the vehicle in order to support the weight and force of the passenger stepping on the running board. This force includes a weight supporting component and also a rotational or torquing component, which results for instance, if the passenger steps on the running board off center.

Typically, a number of brackets are attached along the length of the running board in order to connect the running board to the vehicle. Due to the conditions in which the running board is subjected to, the brackets are required to be very substantial in size in order to handle both the weight bearing and rotational force components. The strength characteristics and/or the number of brackets needed to adequately attach the running board can vary. In some circumstances, the brackets are substantial in size in order for the bracket to adequately support the running board and handle the necessary loads. This increases the cost of the bracket when compared to a bracket that is smaller and made of less material. In other cases, many smaller brackets are used to attach the running boards and loads. In many cases, it is a time consuming process to adequately secure the running board using many smaller brackets in order to support the forces applied to the running board.

Further, due to the design of the running board and vehicle, the running board is connected to a side of the vehicle. This single side connection creates a pivot point or area where the running board rotates with respect to the vehicle when weight or a force is applied to the running board. Since the running board can only be connected to the vehicle along one side or the other, the brackets are typically very substantial in order to adequately secure the running board to the vehicle and support the necessary loads. However, unless the brackets are robust, the brackets cannot always prevent the rotational movement of the running board due to the running board and vehicle being connected on a single side.

Therefore, it is desirable to develop a bracket assembly in which compact brackets are used to adequately secure the running board to the vehicle so that the running board withstands the forces applied to it and to reduce or prevent rotational movement of the running board with respect to the vehicle.

SUMMARY OF THE INVENTION

The present invention relates to a bracket assembly including a plurality of components attached along a hem line, a plurality of attachment points along the hem line, a first bracket, and a second bracket. The first bracket connects the plurality of components to at least one of the plurality of attachment points, and supports a longitudinal load applied to at least one of the plurality of components. The second bracket connects the plurality of components, and supports a lateral or rotational load applied to at least one of the plurality of components.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In reference to FIGS. 1-14, a bracket assembly is generally shown at 10. The bracket assembly 10 provides a first or longitudinal load bracket 12 and a second or anti-torque bracket 14. Typically, the bracket assembly 10 has a plurality of components connected to one another, such as but not limited to, a first component generally indicated at 16, such as a running board and a second component 18, such as a vehicle rocker panel. A hem line or connection area 20 is the area of contact or connection of the first component 16 and second component 18. Thus, there are a plurality of attachment points along the hem line or connection area 20 where the first component 16 and second component 18 are connected by the first bracket 12.

The first bracket 12 connects the first component 16 and second component 18 along the connection area 20 and the plurality of attachment points. The first bracket 12 extends substantially parallel to the connection area 20 for supporting the longitudinal load applied to the first component 16. The second bracket 14 is connected to the first component 16 and second component 18, so that the second bracket 14 extends substantially perpendicular to the connection area 20 for supporting lateral loads applied to the first component 16. The second bracket 14 prevents the first component 16 from moving or being displaced as a result of torque or a lateral load applied to the first component 16, as described in greater detail below. Thus, the first bracket 12 and second bracket 14 are generally perpendicular to one another.

The first component 16 has a flange generally indicated at 22 that accepts the first bracket 12. Thus, the first bracket 12 is connected to the first component 16 at the hem line or connection area 20. The flange 22 is formed by a portion of the first component 16 wrapping upon itself, such that the flange 22 is integrated with the first bracket 12. A side 23 of the flange 22 forms at least a portion of the connection area 20. The side 23 extends away from the first component 16 or a top 25 of the flange 22 at a predetermined angle. As shown in FIGS. 10-11 and 13-14, the side 23 extends away from the top 25 at approximately a 90° angle. In an alternate embodiment, the side 23 extends away from the first component 16 at a predetermined angle and away from the top 25 at another predetermined angle, such as but not limited to, approximately a 45° angle (FIGS. 4-5 and 7-8). By way of explanation and not limitation, the predetermined angle is dependent upon the design of the first component 16 and second component 18, as described below. It should be appreciated that the flange 22 can be a separate component that is connected to the first component 16 by a suitable fastener.

The first bracket 12 has a rectangular shape with openings for at least one fastener 24 that extends through the first bracket 12, through the first component 16, typically the flange 22, and through the second component 18. Thus, the flange 22 has at least one opening 26 shaped so that the fasteners 24 extend through the openings 26 when the first bracket 12 is being inserted into the flange 22, and when the first component 16 is connected to the second component 18. The fasteners 24 extend through the first component 16 to secure the first component 16 to the second component 18. The first component 16 and second component 18 are connected by fasteners 24 such as, but not limited to, a press-fit rivet, extensions extending from the first bracket 12, a nut and bolt combination extending through the first bracket 12, first component 16, and second component 18, or other suitable fasteners. Alternatively, the first bracket 12, first component 16, flange 22, and second component 18 can be secured together by welding, using adhesives, or the like. The first bracket 12 while shown as a separate component can alternatively be incorporated into the flange 22 of the first component by and EMABOND™ or resistive implant welding process or adhesive or the like to attach the bracket 10 to the flange 22.

By way of explanation and not limitation, the first bracket 12 is made of a steel material due to the strength characteristics of steel materials being capable of adequately securing the first component 16 to the second component 18 with respect to the forces applied to the first bracket 12. However, it should be appreciated that the first bracket 12 can be made of other materials that have similar characteristics as a steel material, which can withstand the forces applied to the first bracket 12.

The connection of the first component 16 and second component 18 by the first bracket 12 at the hem line or connection area 20 creates a pivot point or pivot area, where the first component 16 moves with respect to the second component 18 when a lateral weight or force is applied to the first component 16. Thus, the second bracket 14 connects the first component 16 to the second component 18 substantially perpendicular to the connection area 20 in order to prevent the rotational movement of the first component 16 with respect to the second component 18 caused by the torque or lateral loads or forces applied to the first component 16.

The second bracket 14 has an elongated curvature shape, such as but not limited to an "S" or a mirrored "2" shape, so that the second bracket 14 connects to the base of the first component 16 and the base of the second component 18. However, it should be appreciated that the second bracket 14 can have any predetermined shape so long as the second bracket 14 connects the first component 16 and the second component 18 substantially perpendicular to the connection area 20. Thus, the shape of the second bracket 14 is dependent upon the shape of the first component 16 and second component 18, as described in more detail below.

Figure 1:
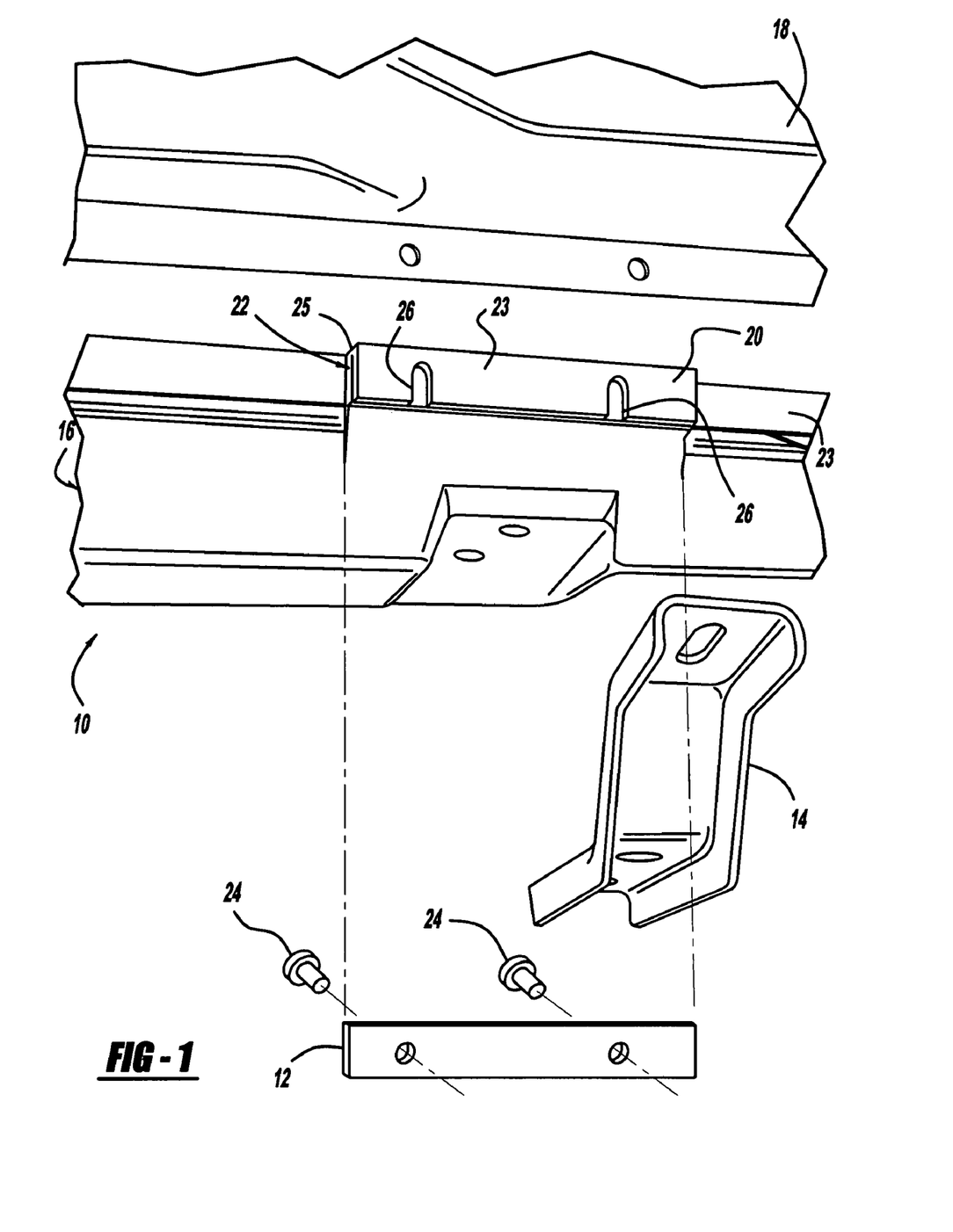
FIG. 1 is an exploded perspective view of a bracket assembly in accordance with an embodiment of the present invention.
Figure 2:
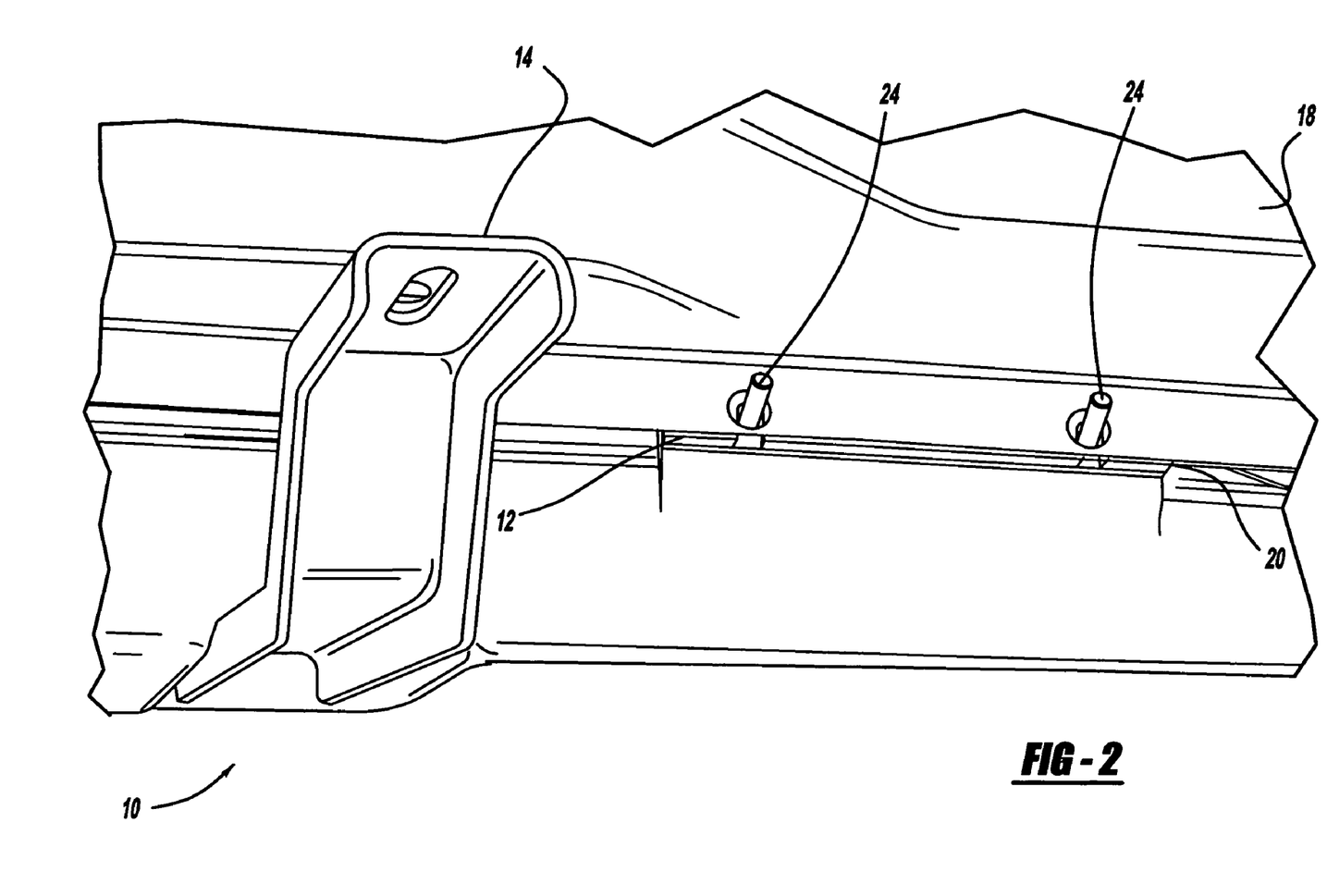
FIG. 2 is a perspective view of a bracket assembly where a second bracket is offset from a first bracket in accordance with an embodiment of the present invention.

Typically, the second bracket 14 is made of a steel material to adequately secure the first component 16 to the second component 18 in order to withstand the torque and prevent the rotational movement of the first component 16 with respect to the second component 18. However, it should be appreciated that any material with similar strength characteristics as to a steel material can be used to form the second bracket 14 so long as the material can support the forces applied to the second bracket 14 through the first component 16. In an embodiment, the second bracket 14 is connected to the first component 16 and the second component 18 so that the second bracket 14 is aligned with the first bracket 12 and flange 22 (FIG. 1). Alternatively, the second bracket 14 is offset from the first bracket 12 when connected to the first component 16 and second component 18 (FIGS. 2-14).

When the second bracket 14 is offset from the first bracket 12 (FIGS. 2-14), the second bracket 14 can be integrated or molded into the first component 16 or the second component 18. Thus, the second bracket 14 is made of the same material as the first component 16 or second component 18. The second bracket 14 can be molded into any predetermined shape depending upon the shape needed to connect the first component 16 and second component 18 perpendicular to the connection area 20.

Figure 3:
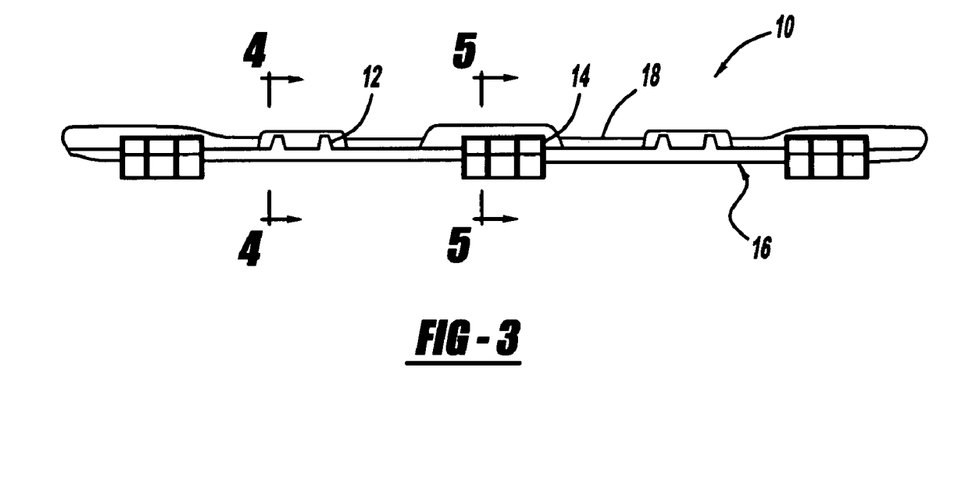
FIG. 3 is a plan view of a bracket assembly in accordance with an embodiment of the present invention.
Figure 4:
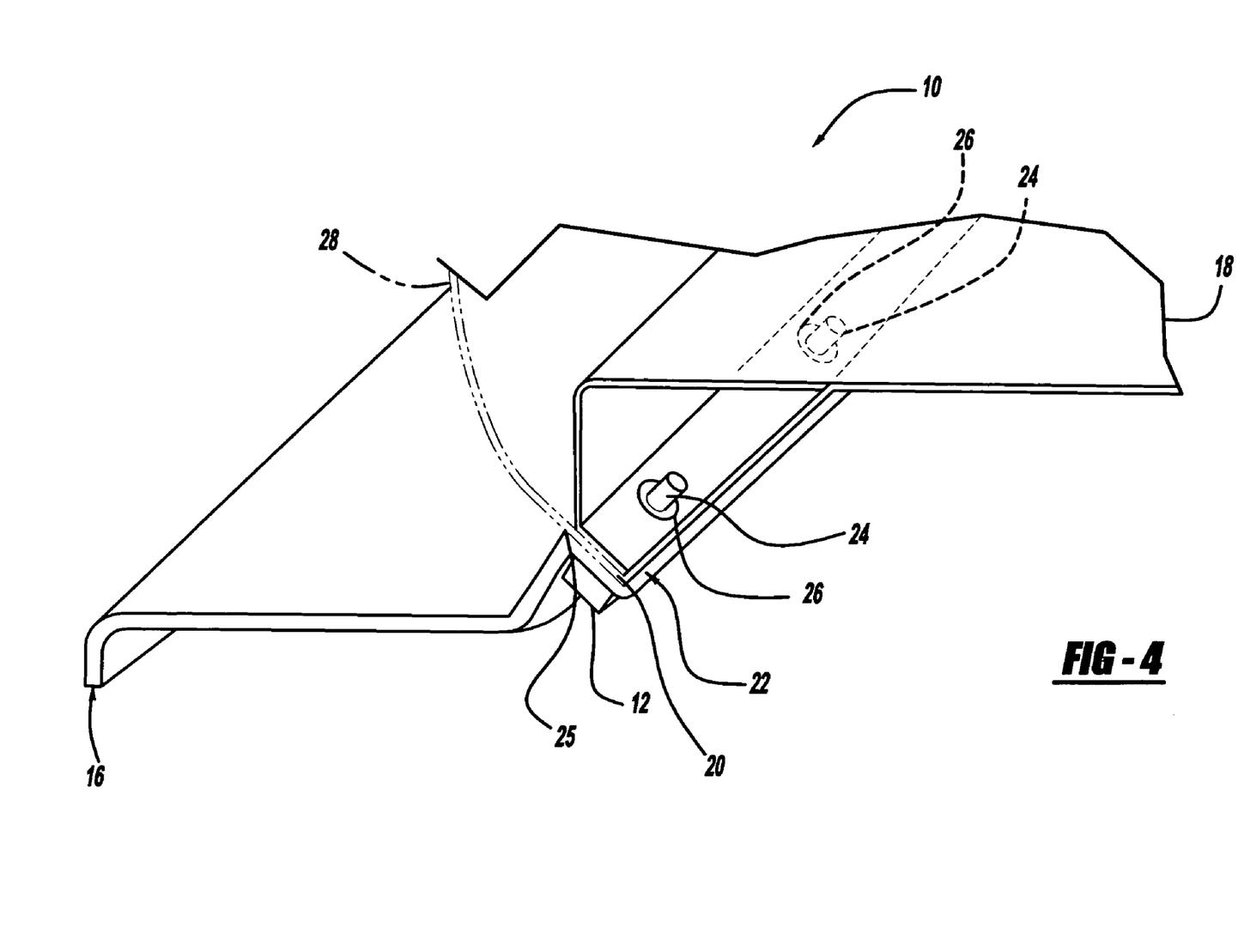
FIG. 4 is a cross-sectional perspective view of a bracket assembly along the line 4-4 of FIG. 3 in accordance with an embodiment of the present invention.
Figure 5:
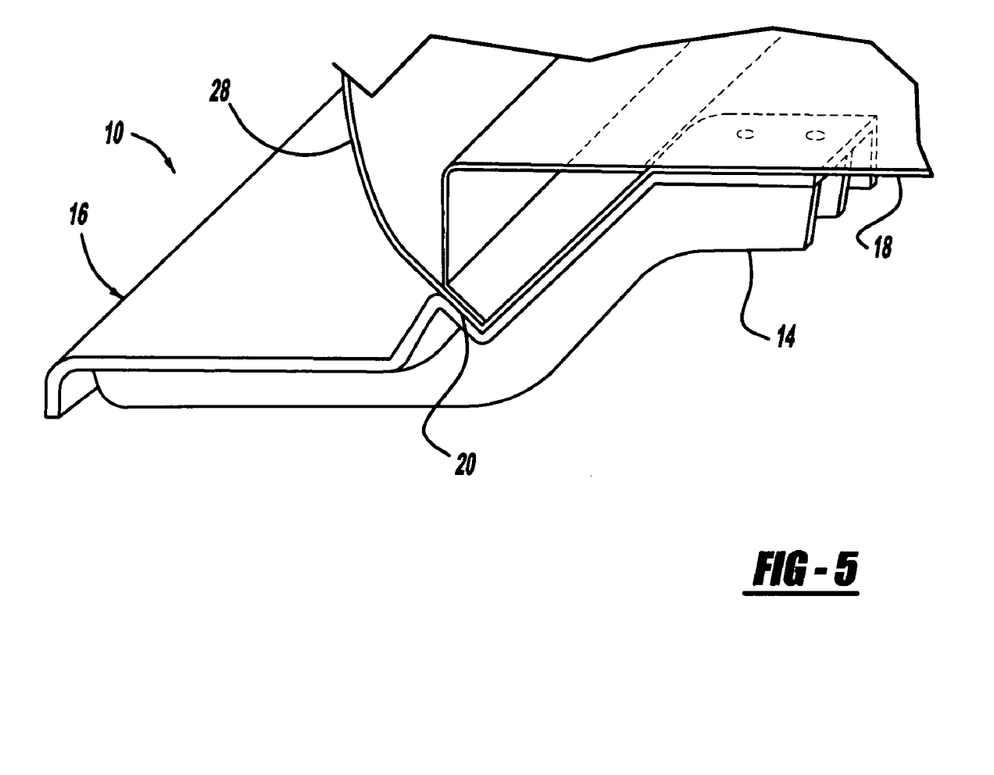
FIG. 5 is a cross-sectional perspective view of a bracket assembly along the line 5-5 of FIG. 3 in accordance with an embodiment of the present invention.
Figure 6:
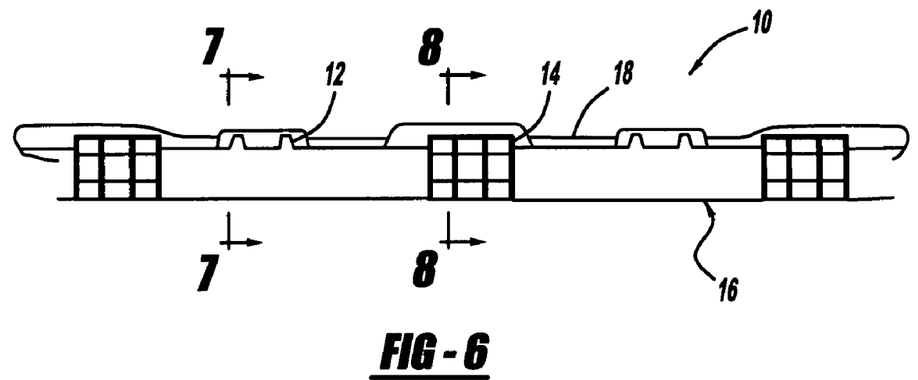
FIG. 6 is a plan view of a bracket assembly in accordance with an embodiment of the present invention.
Figure 7:
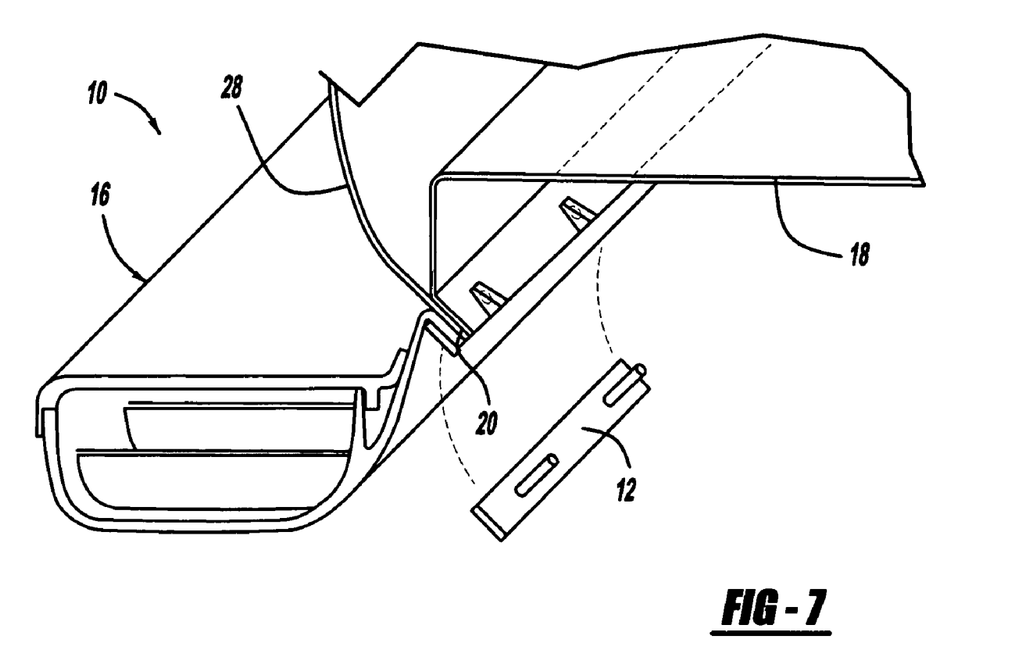
FIG. 7 is a cross-sectional perspective view of a bracket assembly along the line 7-7 of FIG. 6 in accordance with an embodiment of the present invention.
Figure 8:
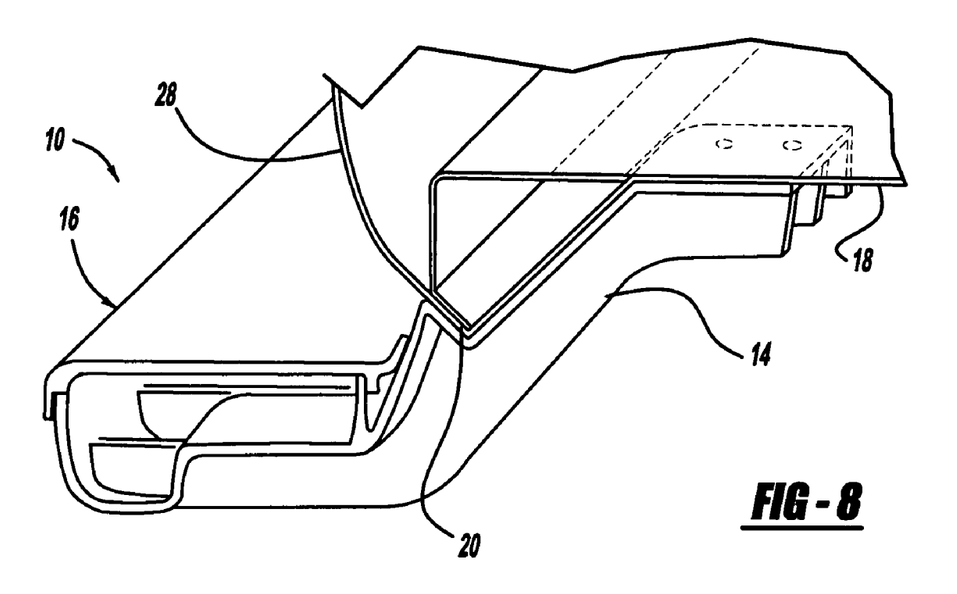
FIG. 8 is a cross-sectional perspective view of a bracket assembly along the line 8-8 of FIG. 6 in accordance with an embodiment of the present invention.

In an embodiment shown in FIGS. 3-5, the flange 22 is at approximately a 45° angle and the first bracket 12 is offset from the second bracket 14. Also, the first component 16 has an open bottom, so that the second bracket 14 can be integrated or molded with the first component 16. Alternatively, the embodiment shown in FIGS. 6-8 include the flange 22 at approximately a 45° angle and the first component 16 is formed by a plurality of pieces, such as but not limited to, a separate top and bottom, where the top and bottom form an enclosed first component 16 and the bottom is integrated or molded to the second bracket 14. However, it should be appreciated that in any of the embodiments shown in FIGS. 3-8 that the second bracket 14 can be connected to the first component 16 by suitable fasteners rather than being integrated.

Figure 9:
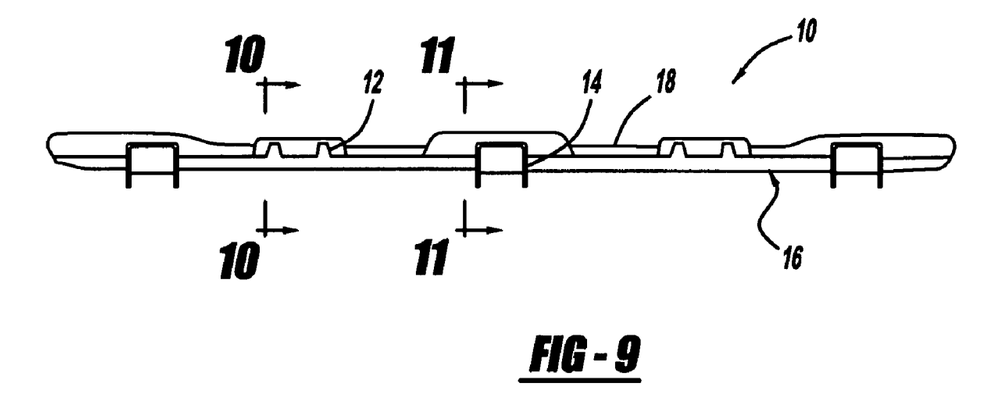
FIG. 9 is a plan view of a bracket assembly in accordance with an embodiment of the present invention.
Figure 10:
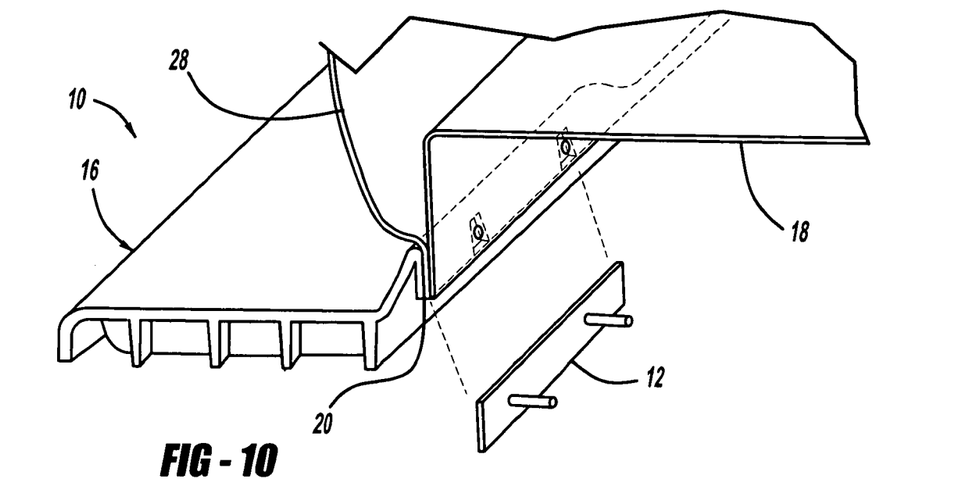
FIG. 10 is a cross-sectional perspective view of a bracket assembly along the line 10-10 of FIG. 9 in accordance with an embodiment of the present invention.
Figure 11:
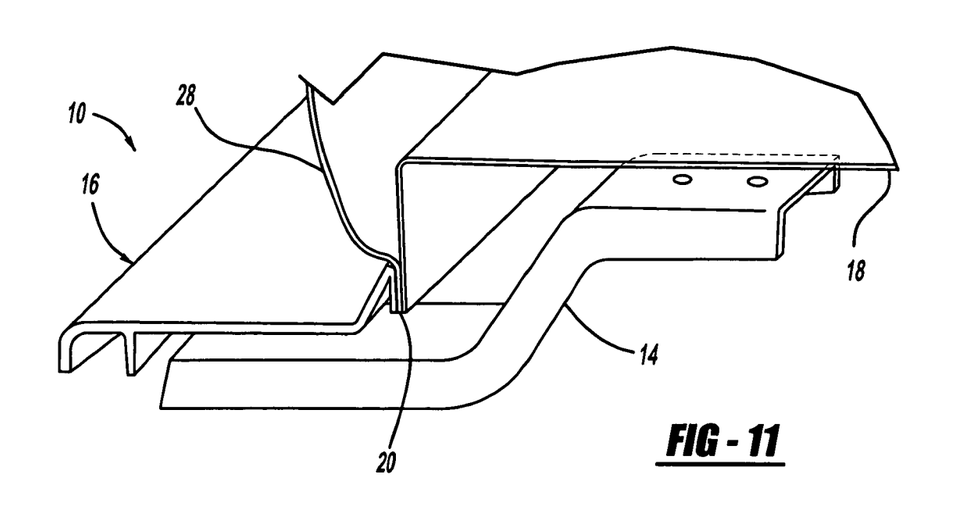
FIG. 11 is a cross-sectional perspective view of a bracket assembly along the line 11-11 of FIG. 9 in accordance with an embodiment of the present invention.
Figure 12:
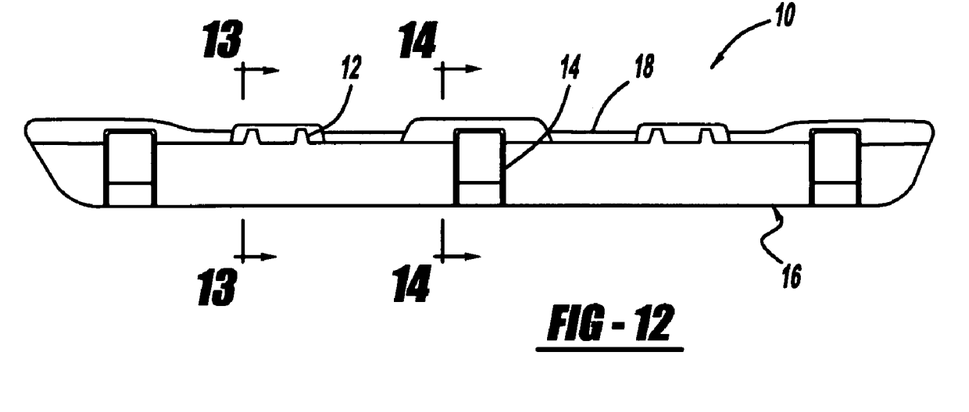
FIG. 12 is a plan view of a bracket assembly in accordance with an embodiment of the present invention.
Figure 13:
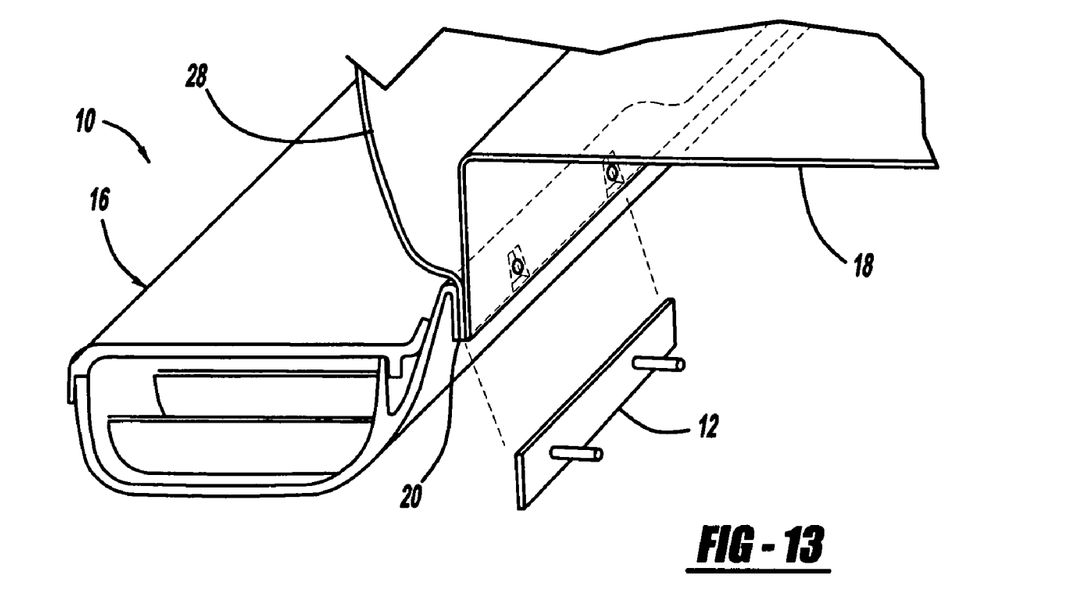
FIG. 13 is a cross-sectional perspective view of a bracket assembly along the line 13-13 of FIG. 12 in accordance with an embodiment of the present invention.
Figure 14:
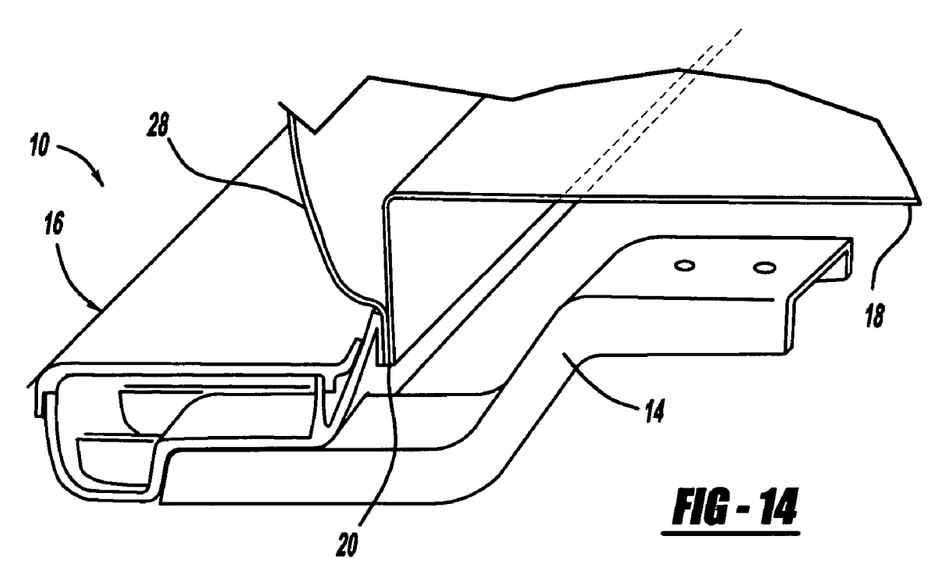
FIG. 14 is a cross-sectional perspective view of a bracket assembly along the line 14-14 of FIG. 12 in accordance with an embodiment of the present invention.

In an embodiment shown in FIGS. 9-11, the flange 22 is at approximately a 90° angle and the first bracket 12 is offset from the second bracket 14. Also, the first component 16 is a single piece and has an open bottom, and the second bracket 14 can be connected to the first component 16 by a suitable fastener as described above. Alternatively, an embodiment shown in FIGS. 12-14 include the flange 22 at an approximately 90° angle and the first bracket 12 being offset from the second bracket 14. The first component 16 has a closed bottom and the second bracket 14 can be connected to the first component 16 by a suitable fastener as described above. It should be appreciated that the above combinations are for explanation purposes only, and the flange 22 angle, bottom of the first component 16, connection of the second bracket 14, and the like can be combined in any predetermined combination so long as the first bracket 12 supports the longitudinal weight and the second bracket 14 supports the torque or lateral weight applied to the first component 16.

With continued reference to FIGS. 1-14, by way of explanation and not limitation, the first component 16 is a running board and a second component 18 is a rocker panel, which are at least a portion of a motorized vehicle (not shown). However, it should be appreciated that the bracket assembly 10 can be used to attach other components, such as but not limited to, body panels, roof racks, spoilers, to connect components to a vehicle frame, or the like. In operation, both the first bracket 12 and second bracket 14 connect the first component 16 and second component 18. The first bracket 12 securely fastens the first component 16 to the second component 18 substantially parallel to the connection area 20 so that the connection between the first component 16 and second compartment 18 can withstand the longitudinal weight and/or forces applied to the first component 16. The second bracket 14 connects the first component 16 and second component 18 substantially perpendicular to the connection area 20 in order to support the rotational torque or lateral load applied to the first component 14; thus, preventing the first component 16 from rotating about the connection area 20 with respect to the second component 18. Typically, the second bracket 14 connects to the rocker panel or second component 18 at the hem line or connection area 20. Thus, the combination of the first bracket 12 supporting the longitudinal load and second bracket 14 supporting the torque or lateral load applied to the first component 16, the brackets 16, 18 adequately secure the first component 16 to the second component 18.

The combination of the first bracket 12 and second bracket 14 securing the first component 16 and second component 18 in multiple directions with respect to the hem line or connection area 20 allows for smaller and less complex brackets to be used when compared to assemblies having only one type of bracket connecting the first component 16 and the second component 18. Thus, the connecting of the first component 16 and second component 18 with the first bracket 12 and second bracket 14 makes for an efficient manufacturing or assembly process. In addition, any predetermined number of first brackets 12 and second brackets 14 can be used to connect the first component 16 to the second component 18, depending upon the length of the first component 16 and second component 18.

Further, the first bracket 12, second bracket 14, and first component 16 are formed to any predetermined shape. The second component 18 typically has different designs between vehicle models. Therefore, the flange 22 on the first component 16 is shaped to extend along and create at least a portion of the connection area 20. Also, the shape of the first bracket 12 and second bracket 14 can be altered based upon the shape needed to connect the first component 16 and second component 18, so long as the first bracket 12 supports the longitudinal forces applied to the first component 16 and the second bracket 14 supports the lateral forces applied to the second component 18. Alternatively, additional predetermined components 28 (shown in phantom in FIGS. 4-5, 7-8, 10-11, and 13-14) are secured by the fasteners 24, which can also affect the design of the brackets 12, 14 and components 16, 18, 28.

Typically, the first component 16 and second component 18 are molded parts. As described above, the second bracket 14 can be molded as part of the first component 16. By way of explanation and not limitation, the first component 16 is made of a long glass fiber polypropylene (LGFPP) material, which has one half inch glass fibers which provide 40 percent of the weight of the material or the like. However, it should be appreciated that similar materials can be used which have similar characteristics so that the first component 16 and second bracket 14, if the second bracket 14 is integrated into the final component 16, can withstand the weight or forces applied.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bracket assembly comprising:
    a first component for attachment to a second component including a hem line portion said first component and said second component being connected to one another along the hem line;
    a plurality of attachment points along said hem line;
    a pivot point formed about said hem line by a first bracket connecting together said first component and said second component on at least one of said plurality of attachment points, wherein said first bracket supports a longitudinal load applied to said first component; and
    a second bracket separate from said first bracket, said second bracket connects to said first component and said second component, wherein said second bracket supports a lateral load applied to said first component, wherein said first component is a running board and said second component is a rocker panel.

2. The bracket assembly of claim 1, wherein said second bracket is an anti-torque bracket and prevents said first component from rotating with respect to said second component.

3. The bracket assembly of claim 1, wherein said first component has a flange that forms at least a portion of said hem line, and said flange accepts said first bracket.

4. The bracket assembly of claim 3, wherein a side of said flange forming at least a portion of said hem line extends away from a top of said flange at a predetermined angle.

5. The bracket assembly of claim 1, wherein said second bracket is aligned with said first bracket when connecting said first component and said second component.

6. The bracket assembly of claim 1, wherein said second bracket is offset from said first bracket when connecting said first component and said second component.

7. The bracket assembly of claim 1, wherein said first bracket is rectangularly shaped and extends substantially parallel along said hem line.

8. The bracket assembly of claim 1, wherein said second bracket has an elongated curvature shape which extends from said first component to said second component.

9. The bracket assembly of claim 1, wherein said first component is formed by a plurality of pieces, wherein said second bracket is integrated to said at least one of said plurality of pieces.

10. The bracket assembly of claim 1, wherein said first component is made of a single piece, wherein said second bracket is connected to said first component.

11. A bracket assembly comprising:
- a first component and a second component connected to one another along a connection area;
- a plurality of attachment points along said connection area;
- a pivot point formed about said connection area by a first bracket connecting together said first component and said second component on at least one of said plurality of attachment points, wherein said first bracket supports a longitudinal load applied to said first component;
- a flange extending from said first component having a side that forms at least a portion of said connection area, wherein said flange accepts said first bracket;
- an anti-torque bracket separate from said first bracket, said anti-torque bracket connects to said first and second components, wherein said anti-torque bracket has an elongated curvature shape and supports a lateral load applied to at least one of said first or second components; and
- at least one fastener that connects said first bracket and said first and second component, wherein said first component is a running board and said second component is a rocker panel.

12. The bracket assembly of claim 11, wherein said anti-torque bracket prevents said first component from rotating with respect to said second component.

13. The bracket assembly of claim 11, wherein said first bracket is rectangularly shaped to extend substantially parallel along said connection area.

14. The bracket assembly of claim 11, wherein said side of said flange extends away from a top of said flange at a predetermined angle.

15. The bracket assembly of claim 11, wherein said anti-torque bracket is aligned with said first bracket when connecting said first component and said second component.

16. The bracket assembly of claim 11, wherein said anti-torque bracket is offset from said first bracket when connecting said first component and said second component.

17. The bracket assembly of claim 11, wherein said first component is formed by a plurality of pieces, wherein said second bracket is integrated to said at least one of said plurality of pieces.

18. The bracket assembly of claim 11, wherein said first component is made of a single piece, wherein said second bracket is connected to said first component.

19. A bracket assembly for connecting a running board to a vehicle comprising:
- a running board;
- a rocker panel connected to said running board along a connection area;
- a plurality of attachment points along said connection area;
- a pivot point formed about said connection area by a rectangularly shaped first bracket connecting together said running board and said rocker panel at least one of said plurality of attachment points, wherein said first bracket supports a longitudinal load applied to said running board;
- a flange extending from said running board having a side that forms at least a portion of said connection area, wherein said flange accepts said first bracket;
- an anti-torque bracket separate from said first bracket, said anti-torque bracket connects to said running board and said rocker panel, wherein said anti-torque bracket has an elongated curvature shape and supports a lateral load applied to said running board; and
- at least one fastener that connects said first bracket, said running board, and said rocker panel.

20. The bracket assembly of claim 19, wherein said anti-torque bracket prevents said running board from rotating with respect to said rocker panel.

21. The bracket assembly of claim 19, wherein said anti-torque bracket is aligned with said first bracket when connecting said running board and said rocker panel.

22. The bracket assembly of claim 19, wherein said anti-torque bracket is offset from said first bracket when connecting said running board and said rocker panel.

23. The bracket assembly of claim 21, wherein said running board is formed by a plurality of pieces, wherein said anti-torque bracket is integrated to said at least one of said plurality of pieces.

24. The bracket assembly of claim 19, wherein said running board is made of a single piece, wherein said anti-torque bracket is connected to said running board.

* * * * *

UNITED STATES PATENT AND TRADEMARK OFFICE
CERTIFICATE OF CORRECTION

| | | |
|---|---|---|
| PATENT NO. | : 7,677,583 B2 | Page 1 of 1 |
| APPLICATION NO. | : 11/786127 | |
| DATED | : March 16, 2010 | |
| INVENTOR(S) | : Armstrong et al. | |

It is certified that error appears in the above-identified patent and that said Letters Patent is hereby corrected as shown below:

Column 8,
Line 36, Claim 23, "claim 21" should be -- claim 19 --.

Signed and Sealed this

Seventh Day of December, 2010

David J. Kappos
*Director of the United States Patent and Trademark Office*